United States Patent
Strong

(10) Patent No.: US 10,707,942 B2
(45) Date of Patent: *Jul. 7, 2020

(54) METHOD AND APPARATUS FOR CONTROLLING EQUIVALENT ISOTROPIC RADIATED POWER

(71) Applicant: Cambium Networks Limited, Ashburton, Devon (GB)

(72) Inventor: Peter Strong, Ipplepen (GB)

(73) Assignee: CAMBIUM NETWORKS LTD, Ashburton, Devon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,319

(22) Filed: Jul. 12, 2019

(65) Prior Publication Data

US 2019/0334605 A1    Oct. 31, 2019

Related U.S. Application Data

(63) Continuation of application No. 16/041,321, filed on Jul. 20, 2018, now Pat. No. 10,355,764, which is a
(Continued)

(30) Foreign Application Priority Data

Oct. 23, 2015   (GB) .................................. 1518778.4

(51) Int. Cl.
*H04B 7/06*     (2006.01)
*H04B 17/11*    (2015.01)
(Continued)

(52) U.S. Cl.
CPC ......... *H04B 7/0682* (2013.01); *H04B 7/0452* (2013.01); *H04B 7/0617* (2013.01);
(Continued)

(58) Field of Classification Search
CPC ...... H04B 7/0682; H04B 7/0452; H04L 27/26
(Continued)

(56) References Cited

U.S. PATENT DOCUMENTS 9,787,386 B2 * 10/2017 Strong ................. H04B 7/0452
10,033,450 B2 * 7/2018 Strong ................. H04B 7/0452
(Continued)

FOREIGN PATENT DOCUMENTS

EP     2 498 462 A1    9/2012
GB     2543563 A       4/2017
(Continued)

OTHER PUBLICATIONS

Great Britain Combined Search and Examination Report corresponding Great Britain Application No. GB1518778.4 dated Jun. 1, 2016, 9 pages.
(Continued)

*Primary Examiner* — Fitwi Y Hailegiorgis
(74) *Attorney, Agent, or Firm* — Brinks Gilson & Lione

(57) ABSTRACT

An access point of a wireless communication network forms beams by applying a weightset for a beamforming weights matrix to signal streams. The Equivalent Isotropic Radiated Power (EIRP) that is emitted from an array of antenna elements at the access point is controlled by calibrating the transmission phase and gain of a respective transmit chain for each antenna element, providing a polar radiation model for an antenna element of the array, and determining a weightset for the weighting matrix subject to a constraint that a maximum total EIRP for the beams in combination in any azimuth direction is maintained within a predetermined EIRP limit, based at least on a spatial separation of the antenna elements, the polar radiation model and the calibrated transmission phase and gain of each respective transmit chain.

18 Claims, 11 Drawing Sheets

Related U.S. Application Data continuation of application No. 15/726,127, filed on Oct. 5, 2017, now Pat. No. 10,033,450, which is a continuation of application No. 15/074,767, filed on Mar. 18, 2016, now Pat. No. 9,787,386.

(51) Int. Cl.
    *H04B 7/0452* (2017.01)
    *H04L 27/26* (2006.01)
    *H04B 17/10* (2015.01)

(52) U.S. Cl.
    CPC .............. *H04B 17/11* (2015.01); *H04L 27/26* (2013.01); *H04B 17/102* (2015.01); *H04L 27/2601* (2013.01)

(58) Field of Classification Search
    USPC .......................................... 375/267; 370/338
    See application file for complete search history.

(56) References Cited

U.S. PATENT DOCUMENTS

| | | |
|---|---|---|
| 2004/0157646 A1 | 8/2004 | Raleigh et al. |
| 2006/0009162 A1 | 1/2006 | Tan et al. |
| 2007/0046539 A1 | 3/2007 | Mani et al. |
| 2007/0077968 A1 | 4/2007 | Kuzminskiy |
| 2011/0134972 A1 | 6/2011 | Zhu et al. |
| 2012/0020396 A1 | 1/2012 | Höhne et al. |
| 2012/0026998 A1* | 2/2012 | O'Keeffe ............... H01Q 1/246 370/338 |

FOREIGN PATENT DOCUMENTS

| | | |
|---|---|---|
| WO | WO 2013/123913 A1 | 8/2013 |
| WO | WO 2014/031669 A1 | 2/2014 |
| WO | WO 2015/085510 A1 | 6/2015 |

OTHER PUBLICATIONS

Zetterberg, P. et al., "Performance of Multiple-Receive Multiple-Transmit Beamforming in WLAN-type Systems under Power or EIRP Constraints with Delayed Channel Estimates," VTC Spring, 2002, IEEE 55$^{th}$, vol. 4, pp. 1906-1910.

Kuzminskiy, A.M., "Downlink beamforming subject to the equivalent isotropic radiated power constraint in WLAN OFDM systems," Signal Processing (Elsevier), vol. 87, No. 5, May 2007, pp. 991-1002.

Vithanage, C.M. et al., "Transmit beamforming methods for improved received signal-to-noise ratio in equivalent isotropic radiated power-constrained systems," IET Communications, vol. 3, Iss. 1, Jan. 2009, pp. 38-47.

Federal Communications Commission, "Guidelines for Determining the Effective Radiated Power (ERP) and Equivalent Isotropically Radiated Power (EIRP) of a RF Transmitting System," Oct. 14, 2010, Downloaded from https://apps.fcc.gov/eas/comments/GetPublishedDocument.html?id=204&tn=255011 on May 27, 2016.

International Search Report corresponding to International Application No. PCT/GB2016/053285 dated Apr. 18, 2017, 7 pages.

Examination Report issued in GB1518778.4 dated Mar. 8, 2019 (6 pages).

European Patent Office Examination Report issued in 16 801 278.9 dated May 24, 2019 (14 pages).

J. Liu et al., "OFDM-MIMO WLAN AP front-end gain and phase mismatch calibration," Proceedings. 2004 IEEE Radio and Wireless Conference (IEEE Cat. No. 04TH8746), Atlanta, GA, 2004, pp. 151-154.

\* cited by examiner

METHOD AND APPARATUS FOR CONTROLLING EQUIVALENT ISOTROPIC RADIATED POWER

CROSS-REFERENCE TO RELATED APPLICATIONS

This application is a continuation of U.S. application Ser. No. 16/041,321, filed on Jul. 20, 2018, issuing as U.S. Pat. No. 10,355,764 on Jul. 16, 2019, which is a continuation of U.S. application Ser. No. 15/726,127, filed on Oct. 5, 2017, now U.S. Pat. No. 10,033,450 issued on Jul. 24, 2018, which is a continuation of U.S. application Ser. No. 15/074,767, filed on Mar. 18, 2016, now U.S. Pat. No. 9,787,386 issued on Oct. 10, 2017, which claims the benefit of UK Application No. GB 1518778.4, filed Oct. 23, 2015, all of which are incorporated by reference in their entirety.

TECHNICAL FIELD

The present invention relates generally to an access point in a point to multipoint wireless network and to methods of operating the access point, and more specifically, but not exclusively, to a method of controlling the Equivalent Isotropic Radiated Power (EIRP) emitted from an array of antenna elements at an access point of a wireless communication network.

BACKGROUND

Modern wireless communication networks are typically placed under great demands to provide high data capacity within the constraints of the allocated signal frequency spectrum. In cellular wireless communication networks, capacity may be increased by re-using frequencies between cells, typically according to a predetermined frequency re-use pattern. A fixed wireless access system may comprise a base station, which may be referred to as an access point, typically mounted on an antenna tower, and a number of subscriber modules installed at customer premises. The area of coverage of an access point may be divided into sectors, each sector being used to transmit and receive with a respective cell. Capacity may be further increased within a cell by steering respective beams towards specific user equipments, which may be referred to as subscriber modules, to allow communication between the access point with improved gain and/or reduced interference reception in comparison with a beam covering a sector. The access point may be equipped with an antenna array and a beamformer for each sector, for forming beams for communication with each respective subscriber module. The beamformer may be required to form beams of various beamwidths in different modes of operation.

It may be a requirement to maintain effective isotropic radiated power (EIRP) within a predetermined limit. This may be achieved by limiting the power transmitted to each antenna element of the antenna array to a level such that, if the worst case maximum array gain were applied by the beamformer, the EIRP limit would not be exceeded. However, this approach has the disadvantage that the access point may be caused to transmit at a level significantly below the EIRP limit for beamformer settings that do not apply the maximum array gain. This may limit the signal to noise ratio achievable on a link and so limit system data capacity.

It is an object of the invention to mitigate the problems of the prior art.

SUMMARY

In accordance with a first aspect of the invention there is provided a method of controlling the Equivalent Isotropic Radiated Power (EIRP) emitted from an array of antenna elements at an access point of a wireless communication network, the access point being configured to form one or more beams by applying a weightset for a beamforming weights matrix to one or more signal streams in a first mode of operation, the method comprising:
calibrating transmission phase and gain of a respective transmit chain for each antenna element;
providing a polar radiation model for an antenna element of the array; and
determining a weightset for the weighting matrix subject to a constraint that a maximum total EIRP for the one or more beams in combination in any azimuth direction is maintained within a predetermined EIRP limit,
wherein said determining is based at least on a spatial separation of the antenna elements, the polar radiation model and the calibrated transmission phase and gain of each respective transmit chain.

This allows the Equivalent Isotropic Radiated Power (EIRP) emitted from an array of antenna elements to be reliably controlled for a variety of beam shapes, so that the access point may transmit closer to an EIRP limit without risking exceeding the limit. It has been found that, in particular, variations in the relative transmission phase of the transmit chains may affect the array gain. Calibration of the respective transmit chains allows variations of phase and gain of each transmit chain with time and/or temperature to be accounted for when calculating EIRP, allowing operation closer to an EIRP limit than would be the case if the transmit chains were not calibrated.

In an embodiment of the invention, said determining comprises:
determining a first weightset for forming the one or more beams; and
amending the first weightset so that the maximum total EIRP for the one or more beams in combination in any azimuth direction is maintained within the predetermined EIRP limit.

This allows a first weightset to be determined, for example by a beamforming process that may optimise a signal to noise ratio to a given subscriber module, and the first weightset may then be amended, for example by applying a gain factor to the weightset, to maintain the EIRP within the predetermined limit when transmitted. This allows the flexibility of generating narrow beams while maintaining operation within an EIRP limit.

In an embodiment of the invention, amending the first weightset comprises:
determining the maximum total EIRP for the one or more beams in combination in any azimuth direction;
comparing the determined maximum total EIRP for the one or more beams with a predetermined EIRP limit;
in dependence on the maximum total EIRP of the one or more beams exceeding the predetermined EIRP limit, amending the first weightset to reduce a gain factor for at least one of the one or more signal streams to reduce the maximum EIRP of the first beam to be within the EIRP limit.

This allows selective reduction of the EIRP of respective beams.

In an embodiment of the invention, said calibrating of the respective transmit chains is as a function of frequency, and wherein the gain factor is a matrix of gain as a function of frequency.

This allows gain to be maintained at frequencies that do not exceed the EIRP limit, improving overall signal to noise ratio.

In an embodiment of the invention, said calibrating of the respective transmit chains comprises:

generating an Orthogonal Frequency Division Multiplexing (OFDM) test symbol for each transmit chain;

combining signals from each transmit chain into a combined channel;

receiving a combined OFDM symbol in the combined channel, the combined OFDM symbol comprising respective subcarriers transmitted by respective transmit chains; and calibrating each transmit chain based on the received respective subcarriers in the combined OFDM symbol.

This allows calibration to be performed using a simple passive combiner.

In an embodiment of the invention, each respective OFDM test symbol comprises a respective set of energised subcarriers.

This allows the test symbols to be received without interference between the test symbols.

In an embodiment of the invention, a relationship between the OFDM test symbols is characterised by a Hermitian matrix.

This allows orthogonal results to be derived for the transmission characteristics of the transmit chains.

This allows a simple receiver architecture to be implemented using a combiner, and reduces test time by enabling the test symbols to be received simultaneously without interference between the test symbols.

In an embodiment of the invention, the method comprises providing an isolation between antenna elements of at least 30 dB.

This allows an accurate model of EIRP to be determined without modelling interaction between antenna elements, so that the access point may be operated nearer to a predetermined EIRP limit.

In an embodiment of the invention, the method comprises performing said calibrating of the transmission phase and gain of respective transmit chains periodically as part of a time frame sequence including time frames for the transmission of payload data.

This allows variations of the gain and/or phase of the transmit chains with time and/or temperature to be calibrated.

In an embodiment of the invention, the period between performance of calibration is less than or equal to 64 time division duplex frames.

This allows accurate calibration.

In an embodiment of the invention, the period is 8 to 32 time division duplex frames.

This has been found to offer a good trade off between calibration accuracy and throughput of payload data, which may be inhibited during calibration.

In an embodiment of the invention, the method comprises providing the antenna array, the respective transmit chains and a combiner network for the combined channel as a unit within a single enclosure arranged to impede changing of the relative special arrangement of the antenna elements by an operator, whereby to maintain a predetermined configuration of the antenna array to enable accurate determination of maximum EIRP.

This allows an accurate determination of EIRP to be maintained after delivery to an operator.

In an embodiment of the invention, the method comprises connecting each respective transmit chain to the antenna array without use of coaxial cable connectors.

This allows accurate determination of EIRP to be maintained after delivery to an operator by preventing reconfiguration of the equipment.

In an embodiment of the invention, the method comprises:

switching from a first mode of operation to a second mode of operation;

in the second mode of operation, configuring one or more beams by applying a second weightset for the beamforming weights matrix to the one or more signal streams, wherein the second weightset is determined subject to a constraint that a maximum total EIRP for the one or more beams in combination in any azimuth direction is maintained within the same predetermined EIRP limit as for the first mode.

This allows flexibility of operation in terms of beamwidth while maintaining transmitted power within an EIRP limit.

In an embodiment of the invention, the first mode is a sector mode in which signals from the respective transceiver chains are combined to form a beam sufficiently broad to provide coverage of a sector of a cellular radio network; and the second mode is a combining mode, in which signals from the respective transceiver chains are combined to form a beam which is narrower in azimuth than that formed in the sector mode to provide a beam steered to an individual subscriber mode within the sector of a cellular radio network.

This allows the flexibility of switching to a beamformed mode of operation, for example for communication to a given subscriber module, while maintaining transmitted power within an EIRP limit.

In an embodiment of the invention, the first mode is a sector mode in which signals from the respective transceiver chains are combined to form a beam sufficiently broad to provide coverage of a sector of a cellular radio network; and the second mode is a Multiple User Multiple Input Multiple Output (MU-MIMO) mode, in which signals from the respective transceiver chains are combined to form at least two beams carrying different data to respective subscriber modules within the sector of a cellular radio network.

This allows the flexibility of switching to a MU-MIMO mode of operation, for example for communication of respective data streams to several subscriber modules, while maintaining total transmitted power for the MU-MIMO beams within an EIRP limit in all azimuth directions.

In an embodiment of the invention, each weightset comprises respective amplitude and phase values for respective signal streams for respective antenna elements for respective sub-carriers of an OFDM symbol.

This allows beamforming to take into frequency dependent effects.

In accordance with a second aspect of the invention, there is provided an access point for a wireless communication network, the access point comprising:

an array of antenna elements;

a digital beamforming weights matrix for applying a weightset one or more signals streams;

a respective transmit chain for each antenna element; and a processor configured to control the Equivalent Isotropic Radiated Power (EIRP) emitted from antenna array in one or more beams in a first mode of operation by:

calibrating the respective transmit chain for each antenna element in terms of gain and phase;

providing a polar radiation model for an antenna element of the array; and determining a weightset for the beamforming weights matrix subject to a constraint that a maximum total EIRP for the one or more first beams in combination in any azimuth direction is maintained within a predetermined EIRP limit using the weightset, said determining being based at least on a spatial separation of the antenna elements, the polar radiation model and the calibrated gain and phase of each respective transmit chain.

In an embodiment of the invention, the access point comprises:

a combiner network arranged to combine signals coupled from the output of each transmit chain into a combined channel.

In an embodiment of the invention, the access point comprises an OFDM receiver configured to receive an OFDM test symbol in the combined channel.

In an embodiment of the invention, the antenna array, the respective transmit chains and the combiner network are parts of a unit within a single enclosure arranged to impede changing of the spacing of the antenna elements by an operator, whereby to maintain a predetermined configuration of the antenna array to enable accurate determination of maximum EIRP.

In an embodiment of the invention, each respective transmit chain is connected to the antenna array using printed conductors and without the use of coaxial cable connectors.

In an embodiment of the invention, the circuit design and physical layout of the radio frequency transmission paths are the same for each antenna element.

This allows an accurate calculation of EIRP, because unknown radio frequency characteristics will be the same for each antenna element and so may not affect a calculated array gain.

In an embodiment of the invention, the physical layout provides a fixed spacing between the radio frequency transmission paths for each antenna element.

This allows an accurate calculation of EIRP.

Further features of the invention will be apparent from the following description of preferred embodiments of the invention, which are given by way of example only.

DETAILED DESCRIPTION

By way of example, embodiments of the invention will now be described in the context of a fixed wireless access system operating a time division duplex system based on IEEE 802.11 standards at carrier frequencies typically between 5 and 6 GHz. However, it will be understood that this is by way of example only and that other embodiments may involve other wireless systems and frequencies, and embodiments are not restricted to a specific frequency band of operation or a specific standard, and may involve operation in licensed or unlicensed bands.

Figure 1:
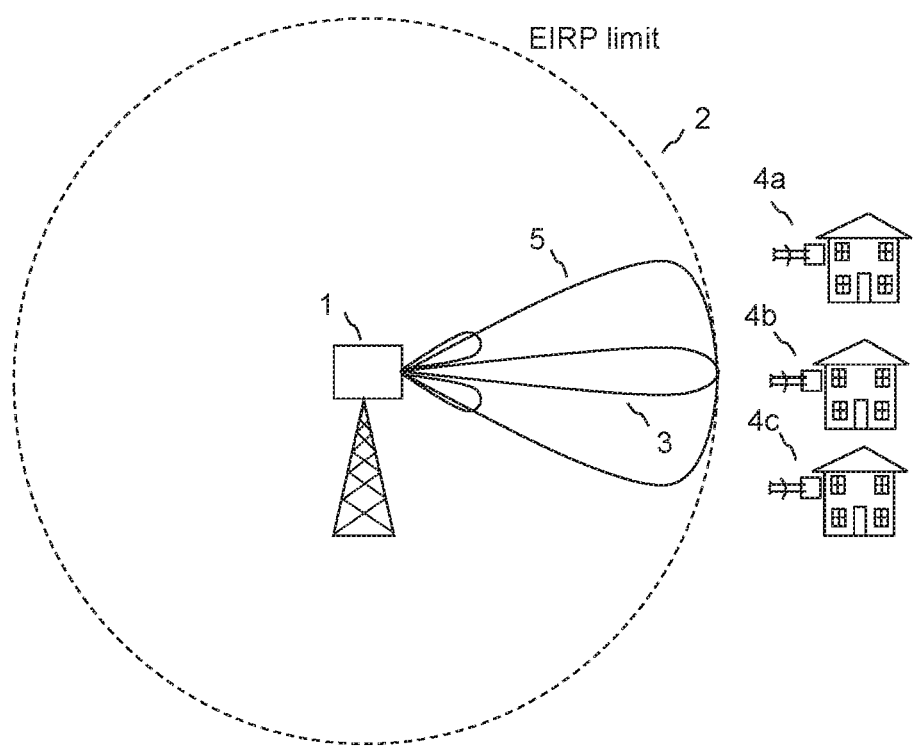
FIG. 1 is a schematic diagram showing an EIRP limit and an access point forming a sector beam or a beam to a subscriber unit within the EIRP limit in an embodiment of the invention.

FIG. 1 is a schematic diagram showing an access point 1 according to an embodiment of the invention for use in a point to multipoint wireless communication network comprising the access point and a plurality of subscriber modules 4a, 4b, 4c. The access point operates within an Equivalent Isotropic Radiated Power (EIRP) limit 2, which applies irrespective of the width of a radiated beam. The access point 1 has an array of antenna elements, each element being arranged to transmit a signal that is appropriately weighted in amplitude and phase to form a sector beam 5 within the EIRP limit in a first mode of operation, and to form a narrower directional beam 3 to a subscriber unit 4b in a second mode of operation, also within the limit. In FIG. 1, the radiated power is indicated by the radius of the beam shape. The EIRP may be expressed as a power, which, if radiated by an ideal isotopic antenna, would produce the same power per unit area at a given distance. For example, an EIRP limit may be +36 dBm, or 4 W.

Figure 2:
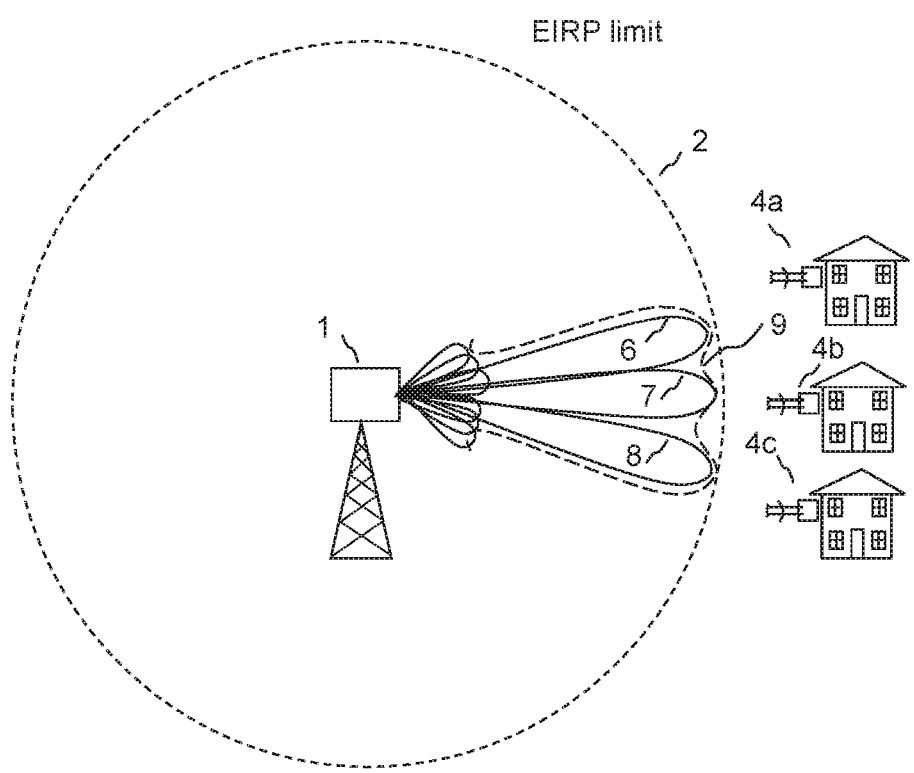
FIG. 2 is a schematic diagram showing an EIRP limit and an access point forming three MU-MIMO beams, the combined EIRP of the MU-MIMO beams being within the EIRP limit in an embodiment of the invention.

FIG. 2 shows the access point 1 forming three MU-MIMO (Multiple User Multiple Input Multiple Output) beams 6, 7, 8 in a third mode, the combined EIRP of the MU-MIMO beams 9 being within the EIRP limit 2. In a MU-MIMO mode, a respective beam is formed for each of multiple data streams using a beamforming weights matrix. So, for example, different payload data may be transmitted simultaneously to subscriber modules 4a, 4b, 4c. Each beam is typically arranged to form a null in the direction of the other beams, so reducing interference between beams. The appropriately weighted signals for each beam are combined by superposition in the beamforming matrix to form a combined weighted signal for transmission by each antenna element. Signals may be separately combined to form a beam at each polarisation.

Figure 3:
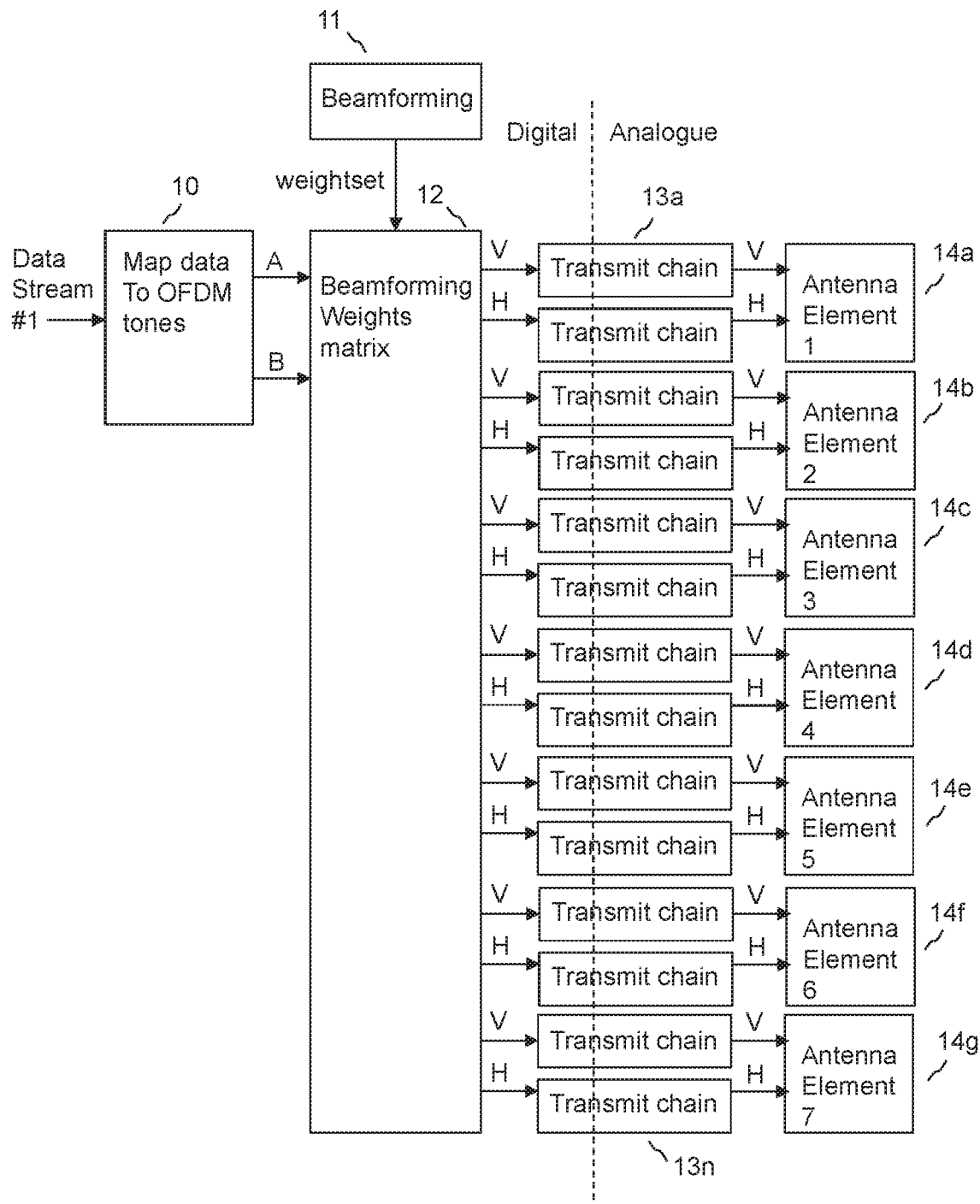
FIG. 3 is a schematic diagram showing a transmission architecture for an access point having a beamfoming weights matrix for a single data stream.

FIG. 3 is a schematic diagram showing a transmission architecture for the access point. In this example, an input of one data stream is shown, data stream #1, for example for use in the sector mode, or the directional beamforming mode. The data stream is mapped to a series of Orthogonal Frequency Division Multiplexing (OFDM) tones by mapping functional block 10. Two streams of OFDM tone values are created, A and B. If a polarisation diversity transmit scheme is used, then A will be a duplicate of B, so that the same data may be transmitted on both polarisations. This gives robust operation. If a polarising multiplexing approach is taken, then the data stream will be split between steam A and stream B of OFDM tone values, so that stream A and stream B are different and each carries part of the data stream. This increases data capacity. An OFDM tone value is a representation of an amplitude and phase of a tone, also referred to as a subcarrier, for an OFDM symbol. This may be typically a vector having an Inphase and Quadrature value. Data may be encoded in the tone value using QAM (Quadrature Amplitude Modulation) modulation.

Streams of OFDM tone values A and B are fed to the beamforming weights matrix 12. The beamforming weights matrix applies a weightset generated by a beamforming function 11, for example using feedback from a subscriber module, to the streams of OFDM tone values. Typically each OFDM tone value is weighted in amplitude and phase by a respective weight value for each nominally vertically polarised (V) and horizontally polarised (H) component for each antenna element. The weighting is typically performed using complex I (Inphase) and Q (Quadrature) components. The weight applied may be different for different subcarriers, i.e. the weight may be frequency dependent. The weightset is calculated by the beamforming function to form an appropriate beam shape when transmitted from the antenna array for the intended mode of operation; a broader beam for a sector mode and a narrower beam, directed at a subscriber module, for a directional beamforming mode. The weighted OFDM tone values for respective V and H components for respective antenna elements are fed to respective transmit chains 13a-13n.

Figure 4:
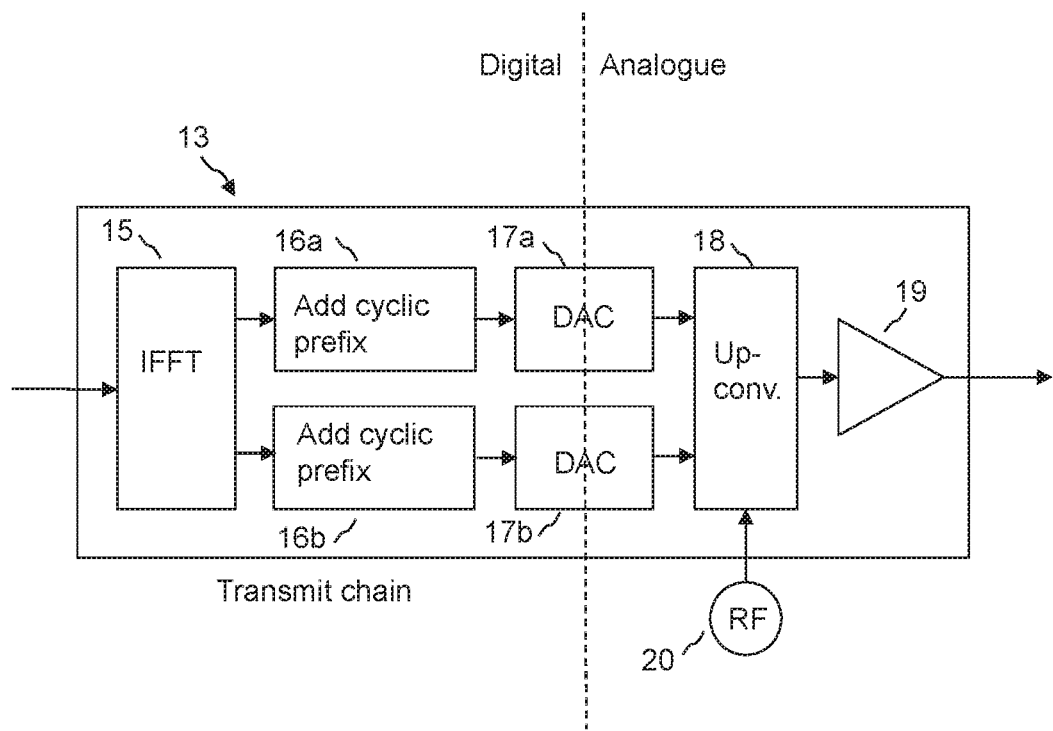
FIG. 4 is a schematic diagram showing a transmit chain.

FIG. 4 is a block diagram showing the components of a typical transmit chain. OFDM tone values, having been appropriately weighted, are applied to IFFT block 15, which forms an OFDM symbol by applying an Inverse Fourier Transform to a set of OFDM tone values for subcarriers of the symbol. Inphase and quadrature streams of time domain samples are formed at the output of the IFFT block. It is noted that the input to the IFFT block is typically also in Inphase (I) and Quadrature (Q) form, but this is shown in FIG. 4 by a single arrow to be compatible with the format of FIG. 3, which also uses a single arrow to represent Inphase and Quadrature components. A cyclic prefix is added 16a, 16b to each of the Inphase and Quadrature streams of time domain samples for the symbol at the output of the IFFT block. Each stream of time samples is converted to the analogue domain by a DAC (Digital to Analogue converter 17a, 17b. Each analogue signal is then upconverted by up converter 18, which typically includes a complex IQ modulator and radio frequency mixers and amplifiers to translate the typically baseband Inphase and Quadrature signals up in frequency, using a radio frequency signal source 20. The modulated signals are then typically amplified by power amplifier 19, and fed to an appropriate polarisation input of an antenna array element, typically a patch antenna, or a single antenna element formed from an array of patches, for example a vertical array of patches.

Returning to FIG. 3, analogue signals at radio frequency are output from respective transmit chains and connected to respective antenna elements of an array of antenna elements is shown 14a-14g, in this case an array of 7 elements, each element having an input for transmission on each of two orthogonal polarisations, in this case nominally vertical V and horizontal H. Radiation from each antenna element combines to form an appropriately shaped beam. The weightsets applied for each polarisation may be independent, so that beams may be formed independently on each polarisation.

Figure 5:
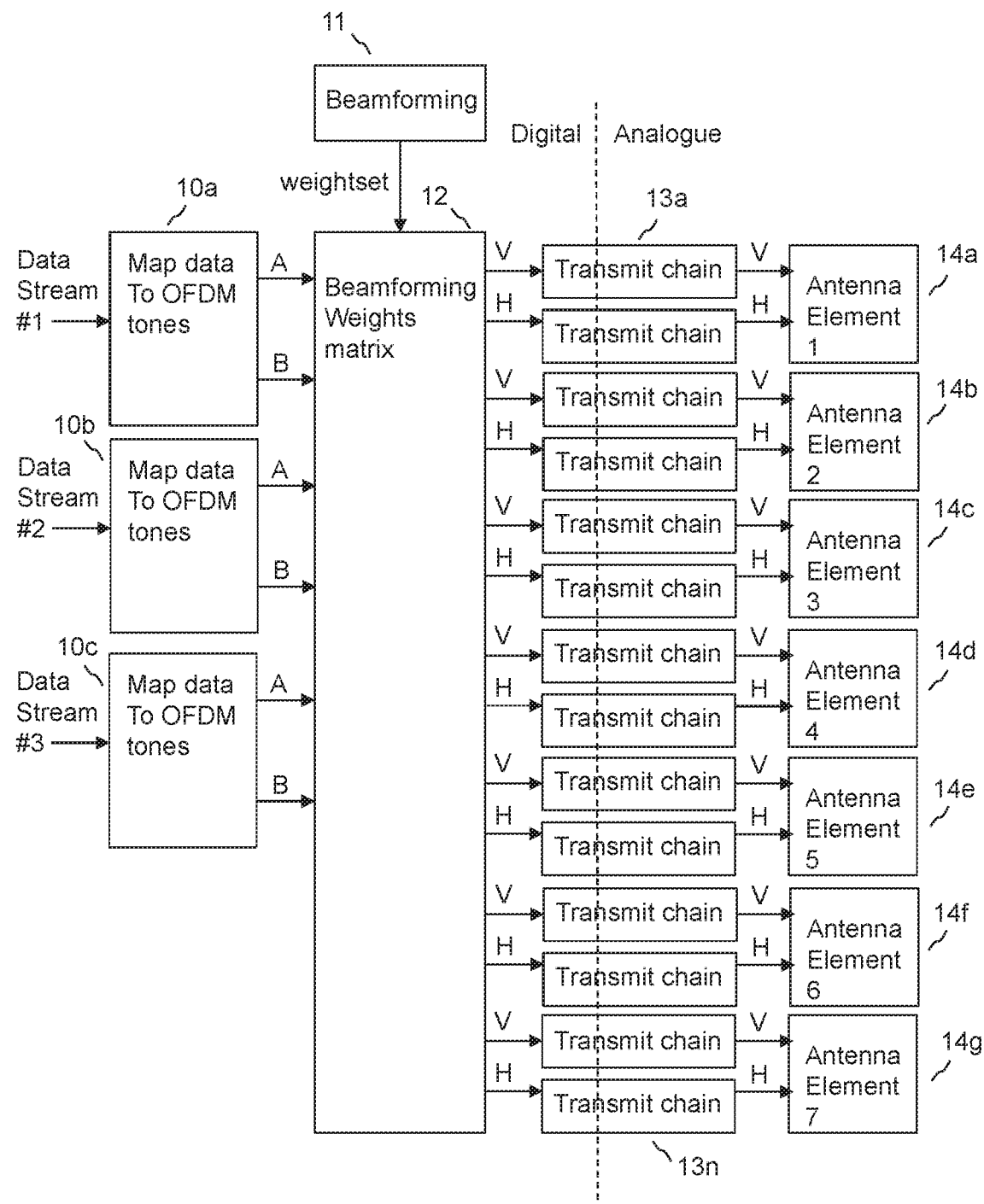
FIG. 5 is a schematic diagram showing a transmission architecture for an access point having a beamfoming weights matrix for multiple data streams.

FIG. 5 shows an access point architecture for multiple data streams. In this example, three data streams are shown: data stream #1, data stream #2 and data stream #3. The architecture is not limited to having three data streams; only one data stream may be used for some modes, for example for a sector mode or a combining mode. For MU-MIMO mode, there may be any number of data streams up to the number of simultaneous MU-MIMO streams to be transmitted. A weightset for the beamforming weights matrix is applied to the data streams, by first mapping 10a, 10b, 10c each data stream to a stream of OFDM tone values, and then applying a respective weight from the weightset to each tone value for each polarisation of each antenna element. Weighted tones for each data stream are combined together by superposition for transmission to a respective transmit chain.

Typically, it is difficult to calculate the maximum EIRP that would result from applying a given weightset with a high degree of confidence, because there are many variable factors that affect the EIRP. It has been found that the antenna radiation pattern of each antenna element, the isolation between antenna elements, the spatial arrangement of the antenna elements, and the gain and phase of the transmit chains and cable runs to the antenna elements affect the EIRP. The gain and phase of the transmit chains may change with time, in particular as a function of temperature, and the configuration of the antenna array and the connection arrangement to the transmit chains is typically out of the control of the manufacturer of the access point. An operator may replace cables, or use different antenna elements or a different spatial arrangement. As a result, in situations where a maximum EIRP limit applies, it may be necessary to limit power output by design so that the EIRP will not be exceeded in the worst case. This has the disadvantage that the access point will often be operating below the EIRP limit, which may limit data capacity of the radio system. For example, the conducted power to each antenna element may be limited to a value such that, if the maximum possible array gain were applied to an access point configured to maximise the array gain, the EIRP limit would not be exceeded. This would, for example, reduce the EIRP of a beam that is configured with less than the maximum possible array gain.

Figure 6:
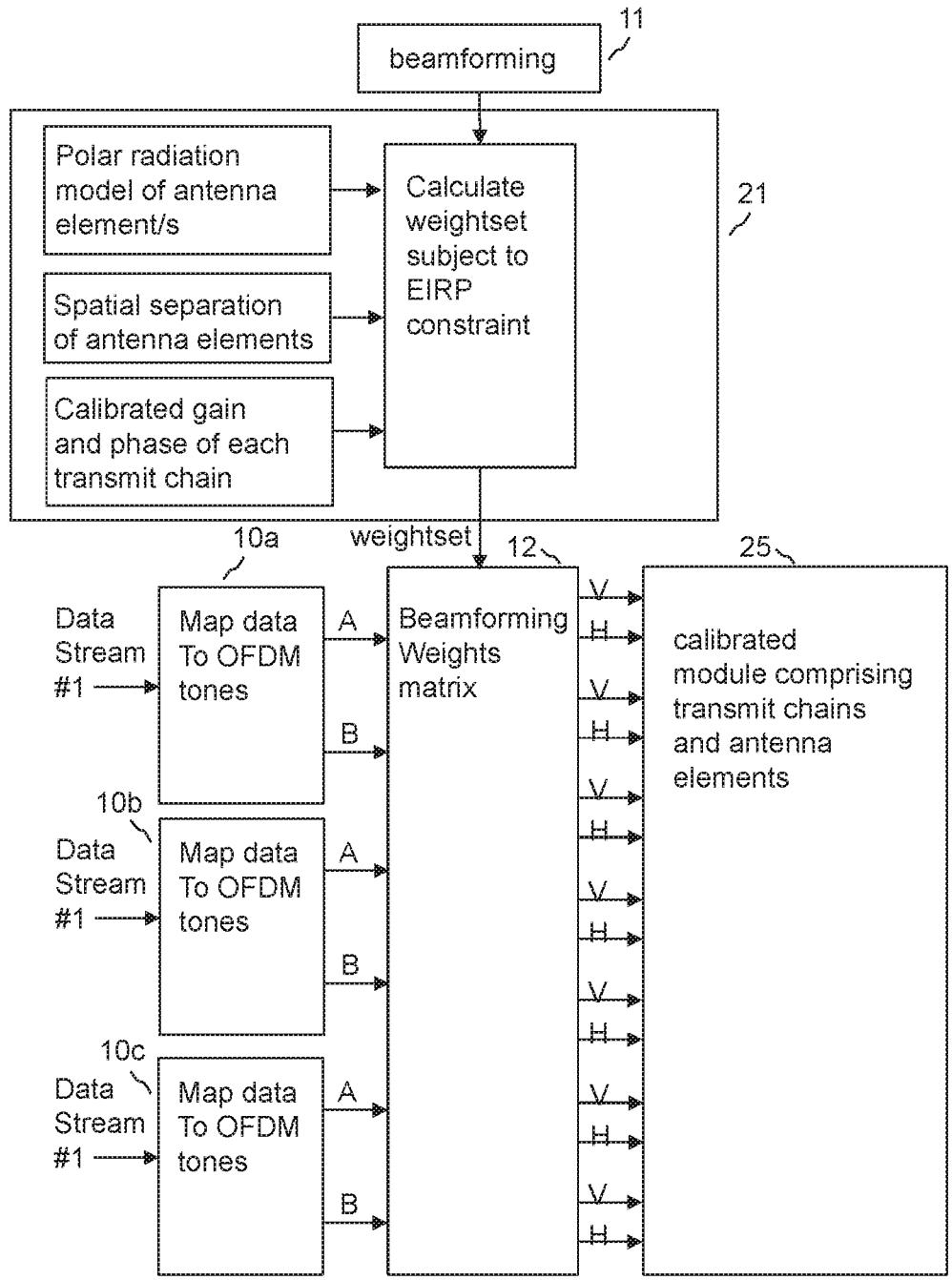
FIG. 6 is a schematic diagram showing an access point having a beamforming weights matrix, a calibrated module comprising transmit chains and antenna elements, and a processor for calculating a weightset subject to an EIRP constraint in an embodiment of the invention.

FIG. 6 shows an arrangement in an embodiment of the invention at an access point for controlling the Equivalent Isotropic Radiated Power (EIRP) emitted from an array of antenna elements. The access point is configured to form one or more beams by applying a weightset for the beamforming weights matrix 12 to one or more signal streams.

In a mode of operation, the method comprises calibrating the transmission phase and gain of a transmit chain for each antenna element. This may be achieved by the use of sounding tones as will be described in connection with FIG. 10.

A weightset for the weighting matrix is determined to form the one or more beams, but the determination is subject to a constraint that a maximum total EIRP for the one or more beams in combination in any azimuth direction is maintained within a predetermined EIRP limit. The determination is based at least on a known spatial separation of the antenna elements, a polar radiation model for an antenna element of the array, for example a measured polar plot for one or more of the antenna elements, and the calibrated phase and gain of each respective transmit chain.

This allows the Equivalent Isotropic Radiated Power (EIRP) emitted from an array of antenna elements to be reliably controlled for a variety of beam shapes, so that the access point may transmit closer to an EIRP limit without risking exceeding the limit. For example, the magnitude of weight values may be operated at a greater level than would otherwise be the case without control of EIRP to compensate for reduced array gain, for example in the case of a broader beam. Array gain is the signal gain resulting from coherent addition of transmitted signals radiated from each element of an antenna array. It has been found that, in particular, variations in the relative transmission phase of the transmit chains may affect the array gain. Calibration of the respective transmit chains allows variations of phase and gain of each transmit chain, and so the gain and phase of the signal transmitted from each antenna element, to be accurately accounted for when calculating array gain and so EIRP. Array gain in a given direction may be calculated by superposition of the relative gain and phase of signals transmitted from each antenna element in that direction. This calculation takes into account the spatial arrangement of the antenna elements, and may also take into account a polar radiation model of each antenna element. The polar radiation model of each antenna element may be the same, or a separate polar radiation model may be used for each element. So, in particular the magnitude of the radiation in the given direction may be taken into account in calculating the array gain in that direction. EIRP may be calculated from array gain on the basis of a known absolute power level of signals for transmission. Maximum EIRP for a beam may be determined by calculating EIRP for a number of transmission directions, and finding a peak value of EIRP. Maximum EIRP for multiple beams, for example MU-MIMO beams, may be found by calculating the EIRP for each beam at each of a number of directions, and combining the EIRP from the beams at each direction to give a total EIRP for each direction, or for a sub-set of directions having highest EIRP. The maximum EIRP is then the Maximum combined EIRP. If the maximum EIRP, which for, multiple beams, is the maximum combined EIRP, is above the EIRP limit, the weightset forming the beam, or beams may be multiplied by a gain reducing factor, to bring the maximum EIRP down to the limit, or to below the limit by a safety margin factor. The entire weightset for combined beams may be multiplied by the gain reducing factor in a simple system, or only the weights for forming the beam which is causing the EIRP to exceed the limit may be reduced. Alternatively or in addition, the magnitude of the digital signal stream which is to be weighted may be reduced by the gain reducing factor. Constraining the maximum EIRP in this way allows operation closer to an EIRP limit than would be the case if the transmit chains were not calibrated, because in that case the array gain would not be accurately known because the amplitude and phase of the signal transmitted from each antenna array element would not be accurately known. Optionally, if the maximum total EIRP is below the EIRP limit, then a gain increasing factor may be applied instead of the gain reducing factor to bring the EIRP closer to the limit.

As shown in FIG. 6, the first weightset may be determined by a beamforming function 11, that may optimise a signal to noise ratio to a given subscriber module according to conventional beamforming techniques. The first weightset may then be amended by a weightset processing function 21, for example by applying a gain factor to the weightset, to maintain the EIRP within the predetermined limit when transmitted. This allows the flexibility of generating narrow beams while maintaining operation within an EIRP limit. The beamforming function 11 and the weightset processing function 21 may be performed by a processor using software or hardware or firmware or a combination of these. Determining the weightset may be performed by determining a first weightset for forming the one or more beams and amending the first weightset so that the maximum total EIRP for the one or more beams in combination in any azimuth direction is maintained within the predetermined EIRP limit.

The first weightset may be amended by determining the maximum total EIRP for the one or more beams in combination in any azimuth direction, and comparing the determined maximum total EIRP for the one or more beams with a predetermined EIRP limit. If the maximum total EIRP of the one or more beams is found to exceed the predetermined EIRP limit, the first weightset is amended to reduce a gain factor for at least one of the one or more signal streams, so that the maximum EIRP of the first beam is reduced to be within the EIRP limit. So, for example, if one MU-MIMO beam is found to exceed the EIRP limit, then the magnitude of the weight values in the weightset that apply to that beam may be reduced.

The calibrating of the respective transmit chains is as a function of frequency, and wherein the gain factor is a matrix of gain as a function of frequency. This allows gain to be maintained at frequencies that do not exceed the EIRP limit, improving overall signal to noise ratio.

The beamforming weights matrix 12 of FIG. 6 operates in a similar manner to that of FIGS. 3 and 5.

A shown in FIG. 6, the transmit chains and antenna elements are provided as a calibrated module 25.

Figure 7:
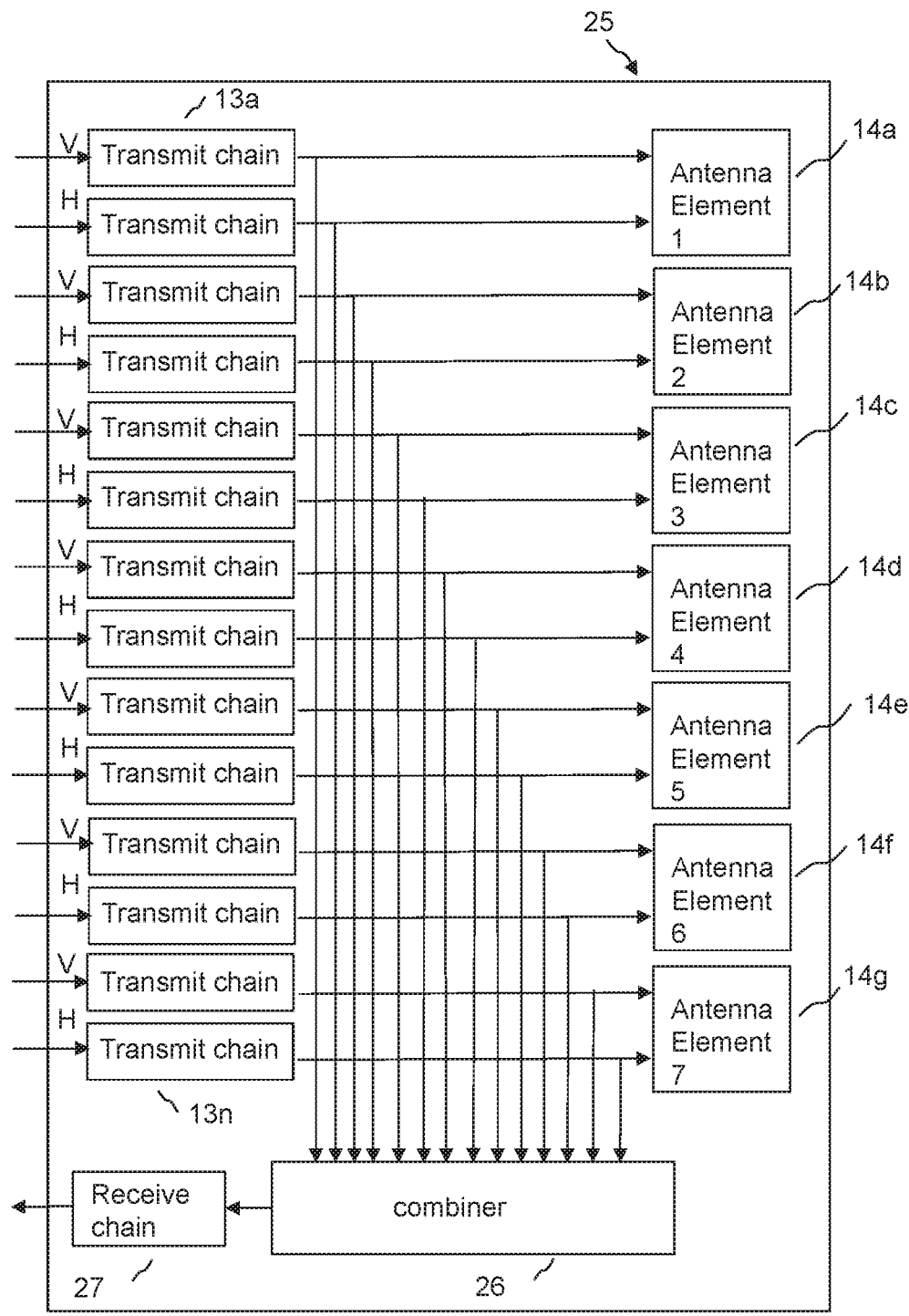
FIG. 7 is a schematic diagram showing a calibrated module comprising transmit chains and antenna elements in an embodiment of the invention.

FIG. 7 shows the calibrated module 25 which comprises transmit chains and antenna elements in an embodiment of the invention. A coupler is provided at the output of each transmit chain 13a-13n, which is arranged to couple a proportion of the signal power output from the transmit chain from the connection from the transmit chain to the antenna element. The coupled signal power is connected to a signal combiner 26, which combines the signals coupled from each transmit chain into a single channel. The combined signal is fed to a receive chain 27.

The calibrated module 25 provides the antenna array, the respective transmit chains and the combiner network for the combined channel as an integrated unit, typically in a single enclosure, arranged to impede changing of the relative special arrangement of the antenna elements by an operator. The antenna elements of the antenna array may be formed from patch radiator elements, which are typically planar metallic structures disposed in a parallel relationship to a ground plane. The patch radiator elements may be held in position in relation to the ground plane by, for example, being printed on a non-conductive film such as polyester, which is held in position on projections from the ground plane. The ground planes of the antenna elements may be fixed together, or formed as a single piece, so that the relative spatial arrangement of the antenna elements cannot be changed in normal use by an operator. The radio frequency interconnections between the transmit chains 13a-13n and respective antenna elements 14a-14g may be formed of printed tracks on a printed circuit board, so that that signal propagation properties will be stable with time. Similarly, the respective signal paths from the output of each transmit chain to the combiner may be formed of printed tracks on a printed circuit board, and are typically passive. This allows a calibration, for example a factory calibration, to be carried out for the gain and phase of each of the signal paths from the output of each transmit chain to the output of the combiner, and of the paths from each transmit chain to the respective antenna elements. This calibration may be used in the calibration of the transmission phase and gain of each transmit chain.

Connecting each respective transmit chain to the antenna array without use of coaxial cable connectors allows accurate determination of EIRP to be maintained after delivery to an operator by preventing reconfiguration of the equipment.

The calibrated module 25 may typically use a symmetrical design. The benefit of a symmetrical design is that unknown but symmetrical characteristics such as PA droop and phase twist, feed delays and so on are not important in calculating EIRP if they are the same for all chains. This translates into a symmetrical hardware design where all elements of the analogue signal paths, including feed networks, RF chains, and PCB layout are identical and repeated with a fixed spacing.

Figure 8:
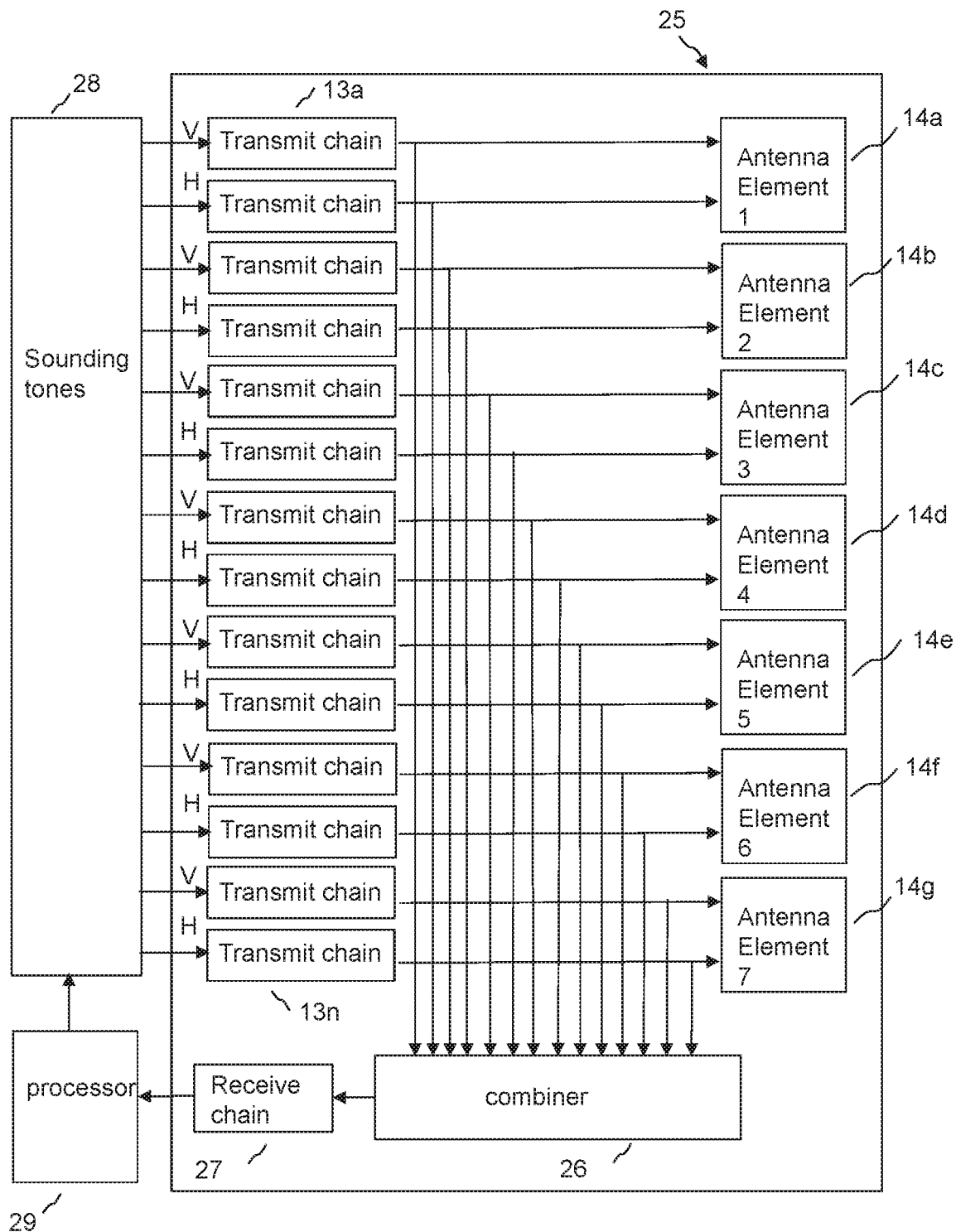
FIG. 8 is a schematic diagram showing an architecture for transmission of sounding tones into a module comprising transmit chains and antenna elements and receiving combined sounding tones from a receive chain in an embodiment of the invention.

FIG. 8 is a schematic diagram showing an architecture for transmission of sounding tones for use in calibrating the calibrated module 25 comprising transmit chains and antenna elements and for receiving combined sounding tones from a receive chain in an embodiment of the invention. Sounding tones, typically predetermined OFDM subcarrier amplitude and phase values to be used for test purposes, including calibration of the transmit chains, are transmitted from a sounding tone transmitting functional block 28. A processor 29 may hold the sounding tone values in memory. The sounding tones may be sent by a processor through the beamforming weights module, with weights set to predetermined values, for connection to the transmit chains, in which the frequency domain tones are converted to time domain sounding symbols.

The sounding symbols coupled from the output of each transmit chain are combined in combiner 26 and the combined sounding symbols are connected to receive chain 27, and the output of the receive chain, comprising amplitude and phase values for each received tone of the symbols, are connected to processor 29. The processor compares the amplitude and phase of the transmitted and received tones, generating calibration data for the respective transmit chains, taking into account the calibrated radio frequency paths from the output of each transmit chain through the combiner and the receive chain.

Figure 9:
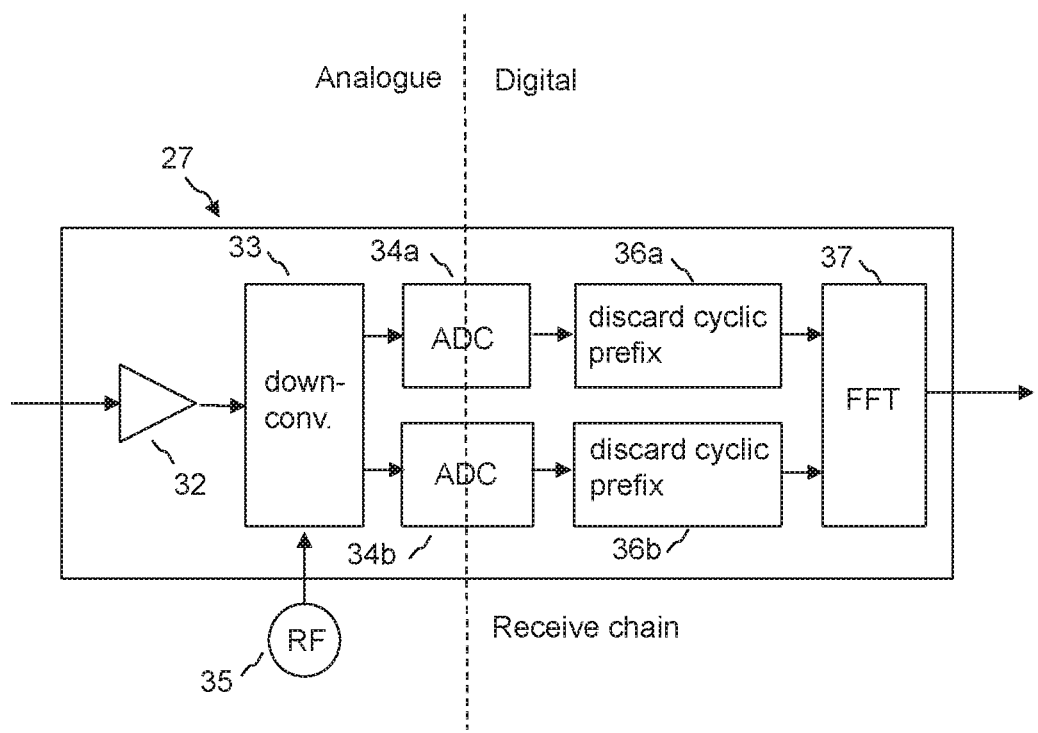
FIG. 9 is a schematic diagram showing a receive chain.

FIG. 9 is a block diagram showing components of a typical receive chain 27. The combined sounding symbols are amplified by low noise amplifier 32, and then down converted from radio frequency, typically 5-6 GHz, by downconverter 33, using radio frequency source 35. The signals are down converted typically to baseband in Inphase and Quadrature components. The baseband signals are then converted to the digital domain in the Analogue to Digital Converter (ADC) 34*a*, 34*b*. The cyclic prefix, if used, is discarded 36*a*, 36*b* and the received symbol is then translated to the frequency domain using Fast Fourier Transform (FFT) 37, to detect amplitude and phase values of each sounding tone. The processor 29 may compare amplitude and phase values of the received tones with the transmitted amplitude and phase values of each tone, to calibrate the transmission phase and gain of each transmit chain. Relative transmit phases and gains of the transmit chains may be calculated.

Figure 10:
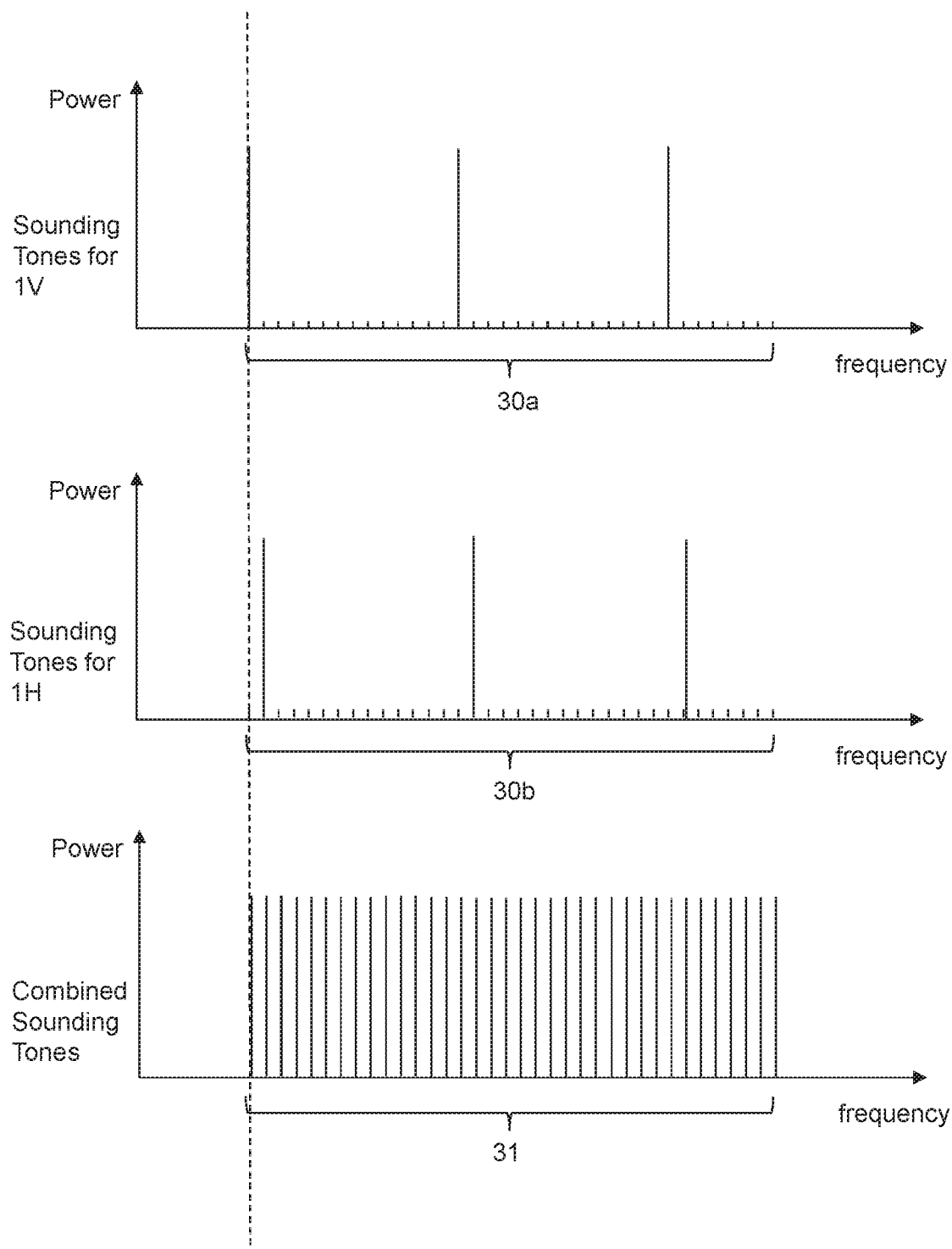
FIG. 10 is a schematic diagram showing generation and combination of sounding tones in the frequency domain in an embodiment of the invention.

FIG. 10 shows an example of generation and combination of sounding tones in the frequency domain in an embodiment of the invention. In this example, an OFDM test symbol is generated for each transmit chain, each respective OFDM test symbol comprising a respective set of energised subcarriers, that is to say sounding tones. In FIG. 10, typical sounding tones are shown for transmit chain 1V and 1H 30*a*, 30*b*. The sounding tones for a given transmit chain are not used for the other transmit chains. This allows the test symbols to be received without interference between the test symbols. The signals from each transmit chain are combined into a combined channel, and a combined OFDM symbol is received in the combined channel, the combined OFDM symbol comprising respective subcarriers, that is to say sounding tones 31, transmitted by respective transmit chains. Each transmit chain is calibrated based on the received respective subcarriers in the combined OFDM symbol. This allows a simple receiver architecture to be implemented using a combiner, and reduces test time by enabling the test symbols to be received simultaneously without interference between the test symbols.

As an alternative to the OFDM test symbols illustrated by FIG. 10, other sounding tones may be used, provided that it is possible to determine the transmission amplitude and phase for each transmit chain from the combined symbol or a series of combined symbols. For example, the sounding tones may be arranged such that the relationship between OFDM test symbols may be characterised by a Hermitian matrix, so that orthogonal results may be derived for each channel.

The calibrating of the transmission phase and gain of respective transmit chains may be performed periodically as part of a time frame sequence including time frames for the transmission of payload data. This allows variations of the gain and/or phase of the transmit chains with time and/or temperature to be calibrated.

The period between performance of calibration may be less than or equal to 64 time division duplex frames, and may be 8 to 32 time division duplex frames, typically 16 frames. This has been found to offer a good trade-off between calibration accuracy and throughput of payload data, which may be inhibited during calibration.

In a time division duplex system, downlink signals transmitted from an access point and uplink signals transmitted from a subscriber module are transmitted at the same frequency. Alternating fixed-duration time periods, known as time division duplex frames, are allocated for uplink and downlink transmission respectively. A time division duplex frame is typically divided into timeslots, each timeslot typically being for communication with a subscriber module, or in the case of MU-MIMO operation, with a group of subscriber modules. The access point may switch from one mode of operation to another between timeslots, for example from sector mode to MU-MIMO mode. Calibration of transmit chains using of sounding tones may be performed within a timeslot.

The access point may switch from a first mode of operation to a second mode of operation, potentially in consecutive timeslots. In the second mode of operation, one or more beams may be configured by applying a second weightset for the beamforming weights matrix to one or more signal streams. The second weightset may be determined subject to a constraint that a maximum total EIRP for the one or more beams in combination in any azimuth direction is maintained within the same predetermined EIRP limit as for the first mode, allowing flexibility of operation in terms of beamwidth while maintaining transmitted power within an EIRP limit. For example, the first mode may be a sector mode in which signals from the respective transceiver chains are combined to form a beam sufficiently broad to provide coverage of a sector of a cellular radio network, the second mode is a combining mode, in which signals from the respective transceiver chains are combined to form a beam which is narrower in azimuth than that formed in the sector mode to provide a beam steered to an individual subscriber mode within the sector of a cellular radio network. This allows the flexibility of switching to a beamformed mode of operation, for example for communication to a given subscriber module, while maintaining transmitted power within an EIRP limit.

Alternatively, the first mode may be the sector mode the second mode may be a Multiple User Multiple Input Multiple Output (MU-MIMO) mode, in which signals from the respective transceiver chains are combined to form at least two beams carrying different data to respective subscriber modules within the sector of a cellular radio network. This allows the flexibility of switching to a MU-MIMO mode of operation, for example for communication of respective data streams to several subscriber modules, while maintaining total transmitted power for the MU-MIMO beams within an EIRP limit in all azimuth directions.

Figure 11:
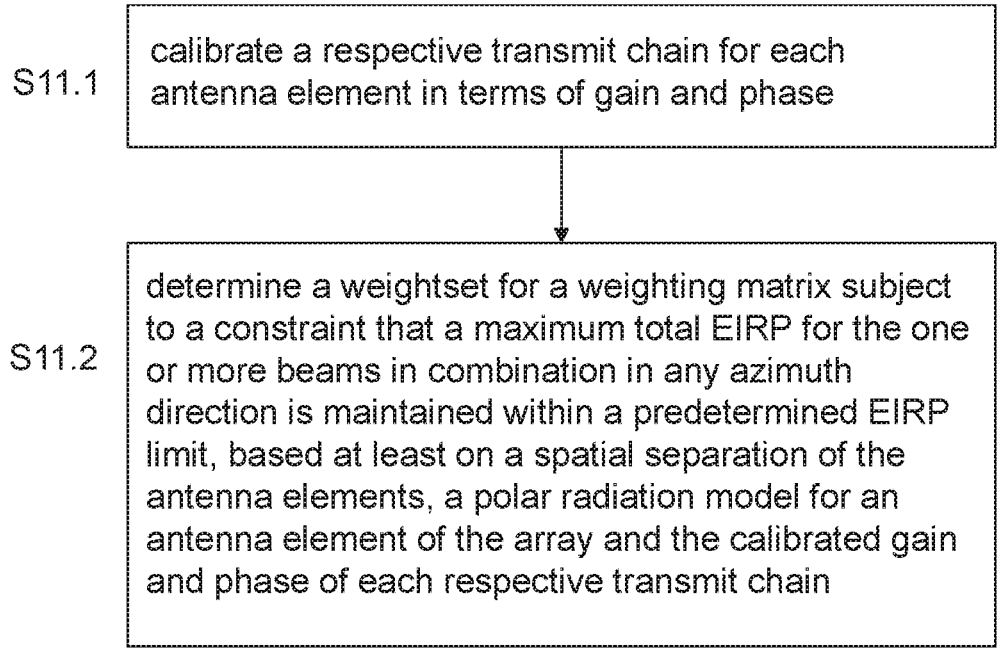
FIG. 11 is a flow chart of a method of controlling the EIRP emitted from an array of antenna elements in an embodiment of the invention.

FIG. 11 is a flow chart of a method of controlling the EIRP emitted from an array of antenna elements in an embodiment of the invention, comprising steps S11.1 and S11.2. It will be understood that the method of embodiments of the invention may be implemented by a processor, which may comprise program code held in a memory configured to cause the processor to perform the method. The processor may comprises one or more digital signal processors, and/or programmable logic arrays. The processor may be configured to control the Equivalent Isotropic Radiated Power (EIRP) emitted from antenna array in one or more beams in a first mode of operation by calibrating the respective transmit chain for each antenna element in terms of gain and phase, providing a polar radiation model for an antenna element of the array, and determining a weightset for the beamforming weights matrix subject to a constraint that a maximum total EIRP for the one or more first beams in combination in any azimuth direction is maintained within a predetermined EIRP limit using the weightset, said determining being based at least on a spatial separation of the antenna elements, the polar radiation model and the calibrated gain and phase of each respective transmit chain.

Each weightset may comprise respective amplitude and phase values for respective signal streams for respective antenna elements for respective sub-carriers of an OFDM symbol. This allows beamforming to take into frequency dependent effects.

The isolation between antenna elements may be at least 30 dB. This allows an accurate model of EIRP to be determined without modelling interaction between antenna elements, so that the access point may be operated nearer to a predetermined EIRP limit.

In an embodiment of the invention, the circuit design and physical layout of the radio frequency transmission paths are the same for each antenna element. This allows an accurate calculation of EIRP, because unknown radio frequency characteristics will be the same for each antenna element and so may not affect a calculated array gain. In an embodiment of the invention, the physical layout of said unit provides a fixed spacing between the radio frequency transmission paths for each antenna element. This allows an accurate calculation of EIRP.

In a fixed wireless access system the subscriber module may be typically mounted to a structure such as a building, typically on the outside of a building in a position that gives good radio reception to an access point. The access point 1 may be located at a convenient point to serve a number of subscriber units. For example the access point, or the antennas for the access point, may be mounted on an antenna tower, and may provide Internet access to a neighbourhood.

The subscriber modules 4a, 4b, 4c shown in FIG. 1 may have antennas which have an aperture defined for example by a reflector, and each antenna element may comprise a probe for receiving and/or transmitting a respective polarisation from/to the aperture. The antenna is typically installed so as to align the peak of the transmit/receive radiation pattern in the direction of the access point 1, which is typically installed on a tower. A command sent to each subscriber module may comprise a map indicating a scheduling of radio resource and/or polarisation to the subscriber module as a function of time. The map may indicate respective allocations to several subscriber units as a function of time, typically all subscriber units served by an access point. The map may indicate, for example, time, polarisation, and/or frequency allocation for transmission and/or reception. The scheduling of radio resource and polarisation may be updated periodically, the period between updates being determined by a scheduler at the access point.

A specific example of an access point according to an embodiment of the invention is given by a point-to-multipoint (PMP) Access Point (AP) with a seven-element dual-polarised adaptive array smart antenna and multi-user MIMO (MU-MIMO) capabilities. This example will now be described in more detail. It will be understood that embodiments of the invention are not limited to this example. The access point in this example is designed for outdoor deployment as an AP with sector coverage in a PMP network. Units may be deployed in multiples to provide 360° coverage from a tower or rooftop. The access point may be a complete radio transceiver operating in the frequency range 5150 MHz to 5925 MHz, using Time Division Duplex (TDD) separation of the uplink and downlink directions.

The access point may include an integrated dual-polarised seven-element adaptive array smart antenna. Seven identical dual-polarised antenna elements and 14 associated transceiver chains may be contained within a single rigid assembly, with each antenna element connected directly to two transceiver chains using printed conductors and wireless via connections. The integration of the components ensures that the spacing and alignment of the antenna elements is known and constant.

Each antenna element may consist of a vertical column of eight radiating patches and separate passive feed networks for horizontal and vertical polarisations. A single element may have a relatively narrow beamwidth (about 8°) in the elevation direction, and a broader beamwidth (about 80°) in the azimuth direction. The gain of each antenna element (that is to say, each column of eight patches) is about 14 dBi. The overall antenna assembly may contain 56 patches, in an array that is seven elements (seven patches) wide and one element (eight patches) high.

The antenna array may provide high isolation between antenna elements. The coupling loss between antenna elements may be greater than 30 dB; this enables the device to model smart antenna operation more accurately.

The integrated assembly in this example does not make use of any connectors between the antenna elements and the associated electronics, and does not provide any test points that could be used to make conducted measurements.

In this example, the maximum output power of a single transmitter chain is about 10 dBm, or 13 dBm for each dual-polarised pair of chains The associated Subscriber Module (SM) devices may contain a directional dual-polarised antenna with two transceiver chains. The SMs may support a single data stream using polarisation diversity or polarisation multiplexing. In MU-MIMO operation, the AP may support several (up to seven in this example) parallel data streams, where each stream is associated with a different SM device.

The access point in this example supports four distinct smart antenna modes: Combining mode; Sector mode; MU-MIMO mode; and Sounding mode.

The access point in this example uses the combining smart antenna mode when communicating with a single SM over a known channel. The beamforming action produces a pattern that is significantly narrower in the azimuth direction than that of a standard sector antenna, allowing the main antenna response to be steered to an individual SM by varying the digital amplitude and phase weights in the 14 chains. The narrower beamwidth in this mode helps to reduce the inter-cell uplink interference level received at the AP compared with reception using a standard sector antenna. When deployed throughout a network, the narrower downlink beamwidth also tends to reduce overall inter-cell interference levels at SMs.

Control functions in the AP may automatically adjust digital transmit gain to compensate for array gain in the combining mode, ensuring that the radiated power is never greater than the power allowed by the relevant rules. The gain adjustment may be determined using an accurate model of smart antenna operation based on a frequency-dependent model of the polar response of a single antenna element. The model increases digital gain as the beam is steered away from the centre in order to maintain the configured EIRP across a range of azimuth angles.

The reduction in the drive level that arises as a consequence of utilising array gain has the beneficial outcome of reducing transmitter distortion and thereby contributing to the use of the most efficient modulation modes in the downlink direction.

The access point may use the sector mode when transmitting broadcast data, or when receiving from an SM over an unknown channel. The amplitude and phase weights of the individual chains are selected to provide sector coverage, meaning that overall array gain is close to unity. The advantage of the sector mode compared to using a single antenna element, is that it allows the device to exploit the combined transmitter power of all 14 chains.

The access point may use the MU-MIMO mode to transmit and receive data in several parallel streams where each stream involves a different SM.

The MU-MIMO operation consists of beamforming to maximise the uplink and downlink signal in one stream for each wanted SM, and null-steering to minimise the uplink and downlink signals for SMs that are associated with the other parallel streams. The resulting antenna beams will necessarily be at different azimuth angles such that the antenna beams are substantially non-overlapping.

The MU-MIMO smart antenna mode may be invoked when suitable orthogonal groups of SMs have been identified, and where buffered data is queued, ready to be transmitted to or received from these SMs.

Control functions in the AP may automatically reduce the digital transmit gain to compensate for array gain in the MU-MIMO mode, ensuring that the radiated power at any azimuth angle is less than the power allowed by the relevant rules.

The access point may use the Sounding smart antenna mode to characterise the channel between each of the antenna elements and each of the SMs. The Sounding mode is also used to calibrate the gain and phase of each of the AP transmit chains.

In the Sounding smart antenna mode each OFDM tone may be energised in only one of the 14 chains in this example. It follows from this that all the smart antenna outputs are intrinsically uncorrelated in this smart antenna mode.

For the remaining smart antenna modes, the access point may support two MIMO modes, namely: Polarisation diversity, using cyclic delay diversity (CDD); and Polarisation multiplexing.

In the polarisation diversity MIMO mode, the same data is present in both polarisations during the same symbol period, and the two channels are therefore considered to be partially correlated. In the polarisation multiplexing MIMO mode, the data stream is shared between the two polarisations, and the two channels are therefore considered to be completely uncorrelated.

The selection of the MIMO mode is, in principle, independent of the selection of the smart antenna mode. However, the channel conditions needed for MU-MIMO operation are similar to the channel conditions needed for polarisation multiplexing, and the combination of polarisation diversity and MU-MIMO operation may occur relatively rarely.

Returning to FIG. 3, this shows a block diagram for single stream (sector or combining) operation of the transmit direction in the smart antenna. A single input serial data stream at the left of the figure has been encrypted, encoded for forward error correction (FEC) and scrambled to ensure a known density of transitions in earlier stages not shown in the figure. The first stage shown here maps a sequence of the serial data into separate A and B channels using polarisation diversity (where the same data is present in each channel) or polarisation multiplexing (where the data is divided between two channels), and for each the two channels maps the data into the amplitude and phase coordinates of a set of OFDM tones representing a single OFDM symbol.

The coordinates of the A and B tone sets may then be each multiplied by a set of 14 amplitude and phase weights generated by a beamforming function to create seven H and seven V inputs to the following stage.

In each of the 14 transmitter chains, the weighted tone sets are passed to the IFFT stage to generate a series of in-phase and quadrature time-domain samples for an OFDM symbol. The unit then adds a complex cyclic prefix to the time domain signals and converts the I and Q signals to analogue waveforms. The analogue signals are applied to an up-converter to provide the modulated RF output.

The 14 modulated RF signals are then amplified and applied in pairs to the H and V ports of the seven dual-polarised antenna elements.

Returning to FIG. 5, this shows the block diagram for the weights matrix in the transmit direction for MU-MIMO operation. The weights matrix is similar to the matrix in FIG. 3 except that the unit supports multiple independent data streams, and each data stream is applied to the 14 transceiver chains according to the amplitude and phase weights.

FIG. 5 shows three data streams, so that the weights matrix has dimension 6×14. The unit supports up to seven parallel data streams, meaning that the weights matrix could have dimension 14×14.

The Sounding mode may be used to calibrate the gain and phase of each of the AP transmit chains up to the output of the RF power amplifiers. The amplitude of the transmitted signal is determined by coupling all of the transmitter signals into an accurate detector, and by passing the composite signal into an additional OFDM receiver stage. The device is able to calibrate each transmitter chain by considering the amplitude and phase of each of the 14 sets of OFDM tones separately.

Transmitter gain may be adjusted by a combination of analogue gain adjustments in the RF stages and digital gain and phase adjustments in the calculation of weights in the combining matrix. Analogue gain may be adjusted in a calibration sequence at initialisation of the device, and whenever the maximum transmitted power is changed by the operator. Thereafter, adjustments may be made solely by changing the digital gain in the weights matrix, except that an additional analogue adjustment may occasionally be needed to maintain the desired dynamic range of the digital signals. Analogue adjustments may be avoided as far as possible because MU-MIMO operation must be temporarily suspended whilst the adjustment is made.

The application firmware in the access point may compute the transmitter gain, and amplitude and phase weights for the combining matrix, to provide the required sector, single beam or MU-MIMO beam patterns. This operation is based on an accurate model of smart antenna operation, in which the resultant signal strength at any azimuth angle is determined as the superposition of the signals radiated by the individual antenna elements. This model may automatically and intrinsically allow for array gain in the smart antenna.

The accuracy of the prediction of the behaviour of the system by the model for smart antenna operation may be contributed to by the following factors: the seven antenna elements and the 14 transmitter chains are substantially identical; the spacing between the antenna elements is equal and fixed; the antennas cannot be changed by an installer, and there are no antenna cables that could be changed or disconnected; the model includes the frequency-dependent polar response of a single antenna element; the amplitude and phase response of the transmitter chains is regularly calibrated; the calibration process measures and counters differences between chains that arise because of manufacturing spread, frequency or operating temperature; and the antenna elements are effectively isolated from each other so that interaction between elements is minimal, so that the assumption of superposition is realistic.

The firmware may compute the analogue gain and digital combiner weights subject to the constraint that the resultant radiated power at the peak of the beam (including the effect of array gain) must not exceed the maximum radiated power configured by the operator. The maximum radiated power that an operator can configure is capped at the maximum allowed by the applicable rules, ensuring that the unit will comply with rules for radiated power and radiated power density at any azimuth angle and for any combination of SM locations.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling an Equivalent Isotropic Radiated Power (EIRP) emitted from an array of antenna elements at an access point of a wireless communication network, the access point being configured to form one or more beams by applying a respective weightset for a first and second mode of operation for a beamforming weights matrix to one or more signal streams, the method comprising:

calibrating transmission phase and gain of a respective transmit chain for each antenna element;
providing a polar radiation model for an antenna element of the array;
determining a first weightset for the beamforming weights matrix for the first mode of operation subject to a constraint that a maximum total EIRP for the one or more beams in combination in any azimuth direction is maintained within a predetermined EIRP limit; and
switching from the first mode of operation to the second mode of operation,
wherein the first mode is a sector mode in which signals from the respective transmit chains are combined to form a beam sufficiently broad to provide coverage of a sector of a cellular radio network, and
the second mode is a mode in which signals from the respective transmit chains are combined to form at least one beam which is narrower in azimuth than that formed in the sector mode, the at least one beam being steered to an individual subscriber mode within the sector of the cellular radio network; and
in the second mode of operation, configuring one or more beams by applying a second weightset for the beamforming weights matrix to the one or more signal streams,
wherein the second weightset is determined subject to a constraint that a maximum total EIRP for the one or more beams in combination in any azimuth direction is maintained within the same predetermined EIRP limit as for the first mode,
wherein said determining, in each mode of operation, is based at least on a spatial separation of the antenna elements, the polar radiation model and the calibrated transmission phase and gain of each respective transmit chain.

2. The method according to claim 1, wherein said determining comprises:
determining the first weightset for forming the one or more beams; and
amending the first weightset so that the maximum total EIRP for the one or more beams in combination in any azimuth direction is maintained within the predetermined EIRP limit.

3. The method according to claim 2, wherein amending the first weightset comprises:
determining the maximum total EIRP for the one or more beams in combination in any azimuth direction;
comparing the determined maximum total EIRP for the one or more beams with a predetermined EIRP limit; and
in dependence on the maximum total EIRP of the one or more beams exceeding the predetermined EIRP limit, amending the first weightset to reduce a gain factor for at least one of the one or more signal streams to reduce the maximum EIRP of the first beam to be within the EIRP limit.

4. The method according to claim 3, wherein said calibrating of the respective transmit chains is as a function of frequency, and wherein the gain factor is a matrix of gain as a function of frequency.

5. The method according to claim 4, wherein said calibrating of the respective transmit chains comprises:

generating an Orthogonal Frequency Division Multiplexing (OFDM) test symbol for each transmit chain:
combining signals from each transmit chain into a combined channel;
receiving a combined OFDM symbol in the combined channel, the combined OFDM symbol comprising respective subcarriers transmitted by respective transmit chains; and
calibrating each transmit chain based on the received respective subcarriers in the combined OFDM symbol.

6. The method according to claim 5, wherein each respective OFDM test symbol comprises a respective set of energised subcarriers.

7. The method according to claim 5, wherein a relationship between the OFDM test symbols is characterised by a Hermitian matrix.

8. The method according to claim 1, comprising providing an isolation between antenna elements of at least 30 dB.

9. The method according to claim 1, comprising performing said calibrating of the transmission phase and gain of respective transmit chains periodically as part of a time frame sequence including time frames for a transmission of payload data.

10. The method according to claim 9, wherein a period between performance of calibration is less than or equal to 64 time division duplex frames.

11. The method according to claim 1, comprising providing the antenna array, the respective transmit chains and a combiner network for a combined channel as a unit within a single enclosure arranged to impede changing of a relative special arrangement of the antenna elements by an operator, whereby to maintain a predetermined configuration of the antenna array to enable accurate determination of maximum EIRP.

12. The method according to claim 1, wherein:
the second mode is a Multiple User Multiple Input Multiple Output (MU-MIMO) mode, in which signals from the respective transmit chains are combined to form at least two beams carrying different data to respective subscriber modules within the sector of the cellular radio network,
wherein an array gain is controlled by a gain factor so that a combined EIPR of the MU-MIMO beams in any azimuth direction is maintained within the predetermined EIRP limit.

13. The method according to claim 1, wherein each weightset comprises respective amplitude and phase values for respective signal streams for respective antenna elements for respective sub-carriers of an OFDM symbol.

14. An access point for a wireless communication network, the access point comprising:
an array of antenna elements;
a digital beamforming weights matrix for applying a weightset to one or more signals streams;
a respective transmit chain for each antenna element; and
a processor configured to control an Equivalent Isotropic Radiated Power (EIRP) emitted from the antenna array in one or more beams by:
calibrating transmission phase and gain of a respective transmit chain for each antenna element;
providing a polar radiation model for an antenna element of the array;
determining a first weightset for the beamforming weights matrix for a first mode of operation subject to a constraint that a maximum total EIRP for the one or more beams in combination in any azimuth direction is maintained within a predetermined EIRP limit; and
switching from the first mode of operation to a second mode of operation,
wherein the first mode is a sector mode in which signals from the respective transmit chains are combined to form a beam sufficiently broad to provide coverage of a sector of a cellular radio network, and
the second mode is a combining mode, in which signals from the respective transmit chains are combined to form at least one beam which is narrower in azimuth than that formed in the sector mode, the at least one beam being steered to an individual subscriber mode within the sector of the cellular radio network;
in the second mode of operation, configuring one or more beams by applying a second weightset for the beamforming weights matrix to the one or more signal streams,
wherein the second weightset is determined subject to a constraint that a maximum total EIRP for the one or more beams in combination in any azimuth direction is maintained within the same predetermined EIRP limit as for the first mode,
wherein said determining, in each mode of operation, is based at least on a spatial separation of the antenna elements, the polar radiation model and the calibrated transmission phase and gain of each respective transmit chain.

15. The access point according to claim 14, comprising:
a combiner network arranged to combine signals coupled from an output of each transmit chain into a combined channel.

16. The access point according to claim 15, wherein the antenna array, the respective transmit chains and the combiner network are parts of an integrated unit arranged to impede changing of a spacing of the antenna elements by an operator, whereby to maintain a predetermined configuration of the antenna array to enable accurate determination of maximum EIRP.

17. The access point according to claim 16, wherein each respective transmit chain is connected to the antenna array using printed conductors and without the use of coaxial cable connectors.

18. The access point according to claim 17, wherein a circuit design and physical layout of radio frequency transmission paths are the same for each antenna element, and wherein a physical layout of said integrated unit provides a fixed spacing between the radio frequency transmission paths for each antenna element.

* * * * *